United States Patent [19]

Ohgaki et al.

[11] Patent Number: 4,689,570
[45] Date of Patent: Aug. 25, 1987

[54] DIGITAL PROTECTIVE RELAY MONITORING SYSTEM

[75] Inventors: Kenji Ohgaki; Hiroshi Sato, both of Hyogo, Japan

[73] Assignee: Mitsubishi Denki Kabushiki Kaisha, Tokyo, Japan

[21] Appl. No.: 689,233

[22] Filed: Jan. 7, 1985

[30] Foreign Application Priority Data

Apr. 26, 1984 [JP] Japan .................................. 59-86687
Apr. 26, 1984 [JP] Japan .................................. 59-86688

[51] Int. Cl.$^4$ ...................... H02H 3/00; G01R 31/02; G01R 31/32
[52] U.S. Cl. .................................. 324/418; 324/537; 324/55; 340/646; 340/644
[58] Field of Search .................. 370/76; 340/825.16, 340/646, 644, 514, 651, 652; 324/418, 110, 202, 51, 55

[56] References Cited

U.S. PATENT DOCUMENTS

| 3,408,493 | 10/1968 | Westover | 324/202 |
| 4,107,471 | 8/1978 | Reed | 370/76 |
| 4,224,466 | 9/1980 | Bush | 340/514 |
| 4,420,721 | 12/1983 | Dorey | 324/110 |
| 4,437,056 | 3/1984 | Pierro | 340/514 |

FOREIGN PATENT DOCUMENTS 53-6855 1/1978 Japan .

Primary Examiner—Reinhard J. Eisenzopf
Assistant Examiner—Jose M. Solis
Attorney, Agent, or Firm—Bernard, Rothwell & Brown

[57] ABSTRACT

A digital protective relay monitoring system for testing the analog input section of the relay by application of a monitoring signal, with a frequency different from the power frequency, superimposed on the line voltage and current sensor signals. After the signals have been sampled in the form of digital data, the monitoring signal component is extracted through the digital filtering process and compared with the reference value, and a fault in the analog input section of the relay is detected on the basis of the result of comparison.

6 Claims, 8 Drawing Figures

DIGITAL PROTECTIVE RELAY MONITORING SYSTEM

BACKGROUND OF THE INVENTION

1. Field of the Invention

The present invention relates to a digital protective relay monitoring system for testing the analog input section of the relay.

2. Description of the Prior Art

One conventional system for testing the analog input section of the digital protective relay is disclosed, for example, in Japanese Patent Application Laid-open No. 53-6855. FIGS. 1 and 2 shown two forms of this system. The arrangement of FIG. 1 includes a CT 2 and a PT 3 provided on a power transmission line 1 and connected to input contacts S1 and S1' of an input switch device 8, and a mimic power transmission line 4 provided thereon with a power source 5 for testing, CT 7, and reactor 6. The CT 7 and reactor 6 are connected to input contacts S2 and S2' of the switch 8. Signals on common contacts S and S' of the switch device 8 are fed through respective A/D converters 11 and 12 to a digital processor 9.

For testing the relay, the current and voltage of the power line 1 detected by the CT 2 and PT 3 are replaced with the current and voltage of the mimic power line 4 by the switch device 8. The current and voltage on the mimic power line are produced by the power source 5, and their magnitude can be changed by the taps on the CT 7 and reactor 6 before being entered to the A/D converters 11 and 12. The current and voltage signals fed through the switch device 8 are converted into corresponding digital values by the respective A/D converters 11 and 12, and delivered to the digital processor 9. In the normal operation, the output of the digital processor 9 is sent to a trip circuit so that the power transmission line 1 is shut off by a breaker, while during the test the digital processor 9 compares the outputs of the A/D converters 11 and 12 (derived from the mimic power transmission line 4) with predetermined reference values and, if both values under comparison are not consistent, provides a signal to an alarm circuit.

Another form of the conventional digital protective relay monitoring system disclosed in the patent publication No. 53-6855 is shown in FIG. 2, in which components identical to those in FIG. 1 are referred by the common symbols. This arrangement includes memory circuits 13 and 14. A/D converters 11 and 12 are provided between a CT 2 on the power line 1 and an input contact S1 of a switch device 8 and between a PT 3 and another input contact S1' of the switch device 8, respectively. The memory circuits 13 and 14 are connected to input contacts S2 and S2' of the switch device 8, which has common contacts S and S' connected directly to a digital processor 9. Test data is stored in advance in the memory circuits 13 and 14.

For testing the performance of the relay, the common contacts S and S' of the switch device 8 are moved from the contacts S1 and S1' to the contacts S2 and S2', respectively, so that the memory circuits 13 and 14 are connected through the switch device 8 to the digital processor 9 for transferring digital data of the test current and voltage.

The conventional system arranged as described above has the following shortcomings. The system shown in FIG. 1 needs a mimic power transmission line including a power source, reactor and transformers, resulting in a large scale test equipment. During the test, the current and voltage of the actual power transmission line cannot be delivered to the digital processor, and the power line cannot be protected from a possible fault during the test in which the protective relay is out of commission. The use of the commercial power supply for the testing power source does not provide a high accuracy test result, due to a frequent voltage variation. The system shown in FIG. 2 cannot detect a fault occuring in sections in front of the A/D converters, since the test inputs are introduced at the rear of the A/D converters. In both forms of the system shown in FIGS. 1 and 2, the test is conducted at a certain interval and when a malfunctioning of the system arises the system can possibly encounter a fault of the power transmission line before detecting its own defect, and therefore the conventional system is not sufficient for monitoring the protective relay.

SUMMARY OF THE INVENTION

An object of the present invention is to provide a digital protective relay monitoring system capable of performing reliably and with a simple structure the monitoring of the operation of the analog input section of the relay without suspending the function of the protective relay.

In the protective relay, the voltage input from the power system is normally higher than a certain value, and a fault of the analog input circuit can be detected by checking the input voltage. Whereas, for other input such as the current input which varies in a wide range, a test input needs to be supplied to the input circuit for the detection of its defectiveness. This invention contemplates to provide an improved monitoring system employing in combination a method of supplying a test imput to the input circuit and a method of processing for detecting a fault of the input circuit based on the test input.

According to one aspect of the invention, the improved protective relay monitoring system comprises a circuit which supplies a monitoring signal to the input transformer of the digital protective relay, and means for extracting the monitoring signal after the analog-to-digital conversion and detecting the fault of the analog input section based on the magnitude of the extracted monitoring signal component.

According to another aspect of the invention, the monitoring signal is supplied to filters together with a plurality of signals provided through the input transformers.

DETAILED DESCRIPTION OF THE PREFERRED EMBODIMENTS

Figure 2:
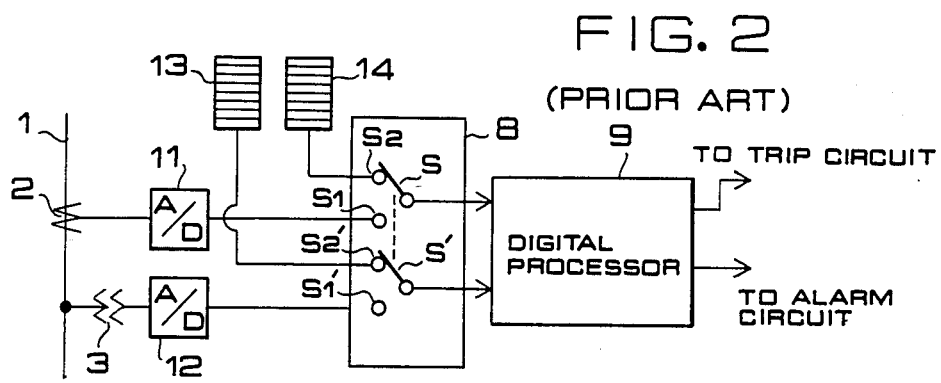
Figure 3:
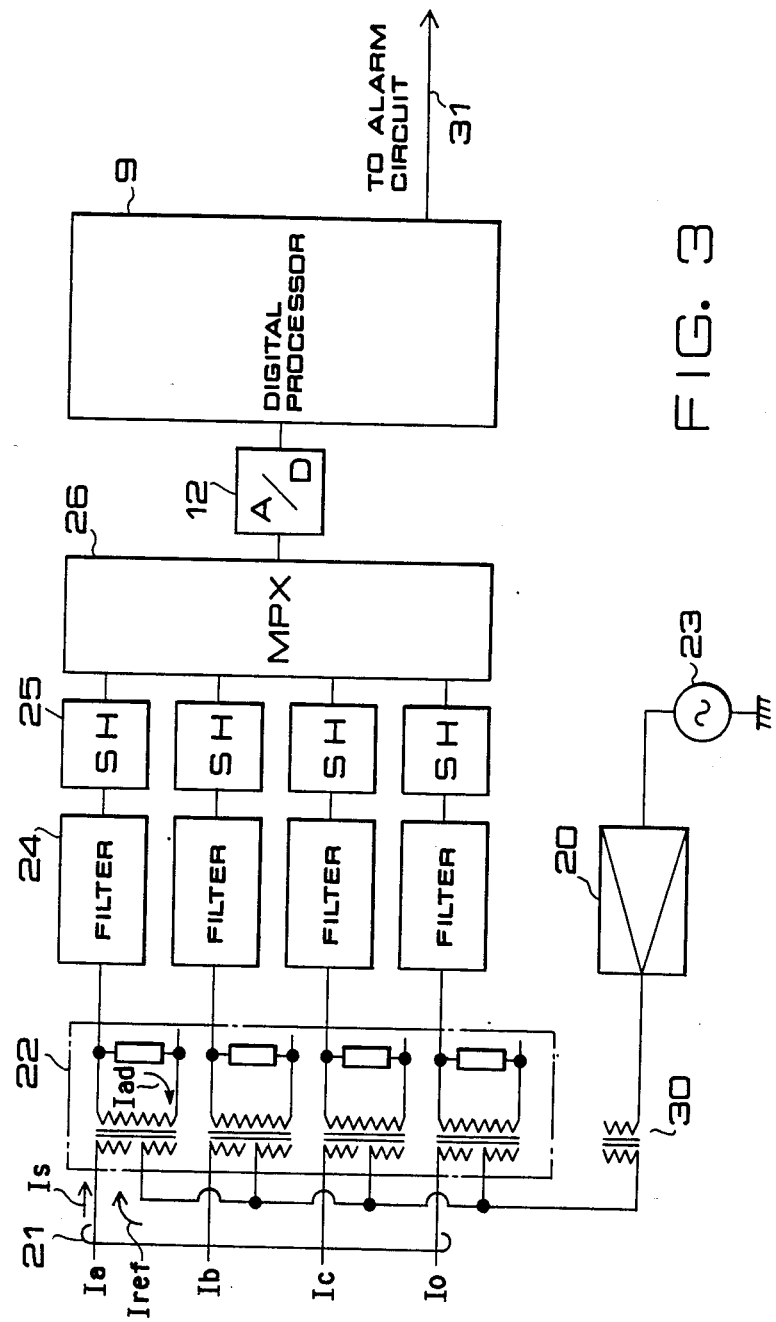
FIG. 3 is a block diagram showing the digital protective relay monitoring system according to the present invention.

An embodiment of the present invention will now be described with reference to the drawings. In FIG. 3, the signal (Iref) generated by the monitoring signal generating circuit 23 is amplified by the amplifier 20 and fed through the insulating transformer 30 to a set of input transformers 22, which also receive input signals (Is) 21 (will be termed simply PCT inputs) from PT and CT on the power transmission line. The PCT inputs (Is) 21 are input signals such as those produced by the PT 3 and CT 2 on the power transmission line as mentioned in connection with FIGS. 1 and 2. Each input transformer 22 has a primary wiring for receiving a PCT input (Is) 21, a primary wiring for receiving the input signal (Iref) from the monitoring signal generating circuit 23, and an output wiring, so that each PCT input (Is) 21 is added with the monitoring input signal (Iref) and the result is provided as a signal (Iad) on the output winding. The output (Iad) in the form of current at the output of each input transformer is transformed into a voltage signal by a resistor connected across the output winding, and it is fed through the filter 24 to the sample holding circuit 25 which operates at a frequency determined by the input transformer 22. One of voltage signals held in a set of sample holding circuits 25 is selected sequentially and fed to the A/D converter 12. The output of the A/D converter 12 in the form of digital data is delivered to the digital processor 9, which issues an alarm output 31 to an external alarm circuit in response to the detection of a fault.

Figure 4:
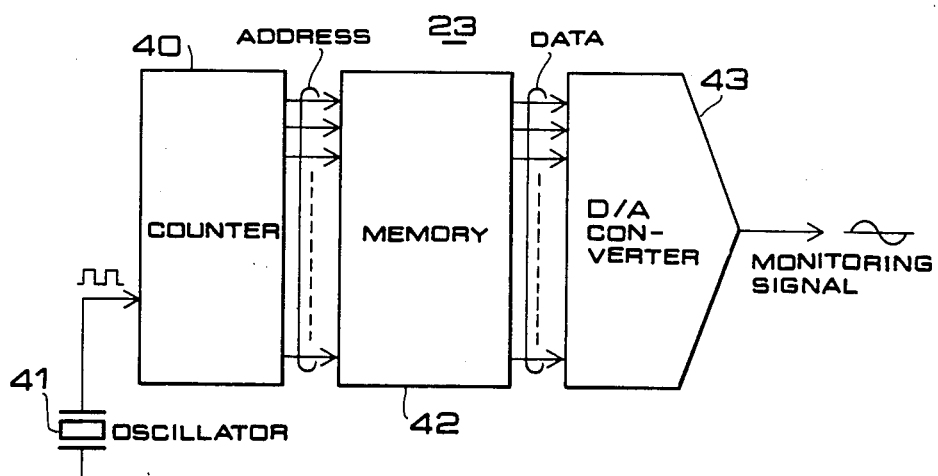
FIG. 4 is a block diagram showing the monitoring signal generating circuit shown in FIG. 3.

FIG. 4 shows an example of the monitoring signal generating circuit 23, in which signal waveform data stored in the memory 42 is released at an arbitrary frequency to the D/A converter 43 so that the a.c. monitoring signal at an arbitrary frequency is produced. The operation of the circuit will be described in more detail. The counter 40 counts up clock pulses generated by the oscillator 41. For example, if the counter 40 is an 8-bit binary counter, it counts from "0000000" to "11111111", or from "0" to "255" in decimal. The number of bits of the counter 40 is actually made equal to the number of address lines to the memory 42. The memory 42 is addressed by the output of the counter 40 so that digital data which has been stored in advance in that location is read out to the D/A converter 43. The D/A converter 43 converts the digital data into an analog signal according to the predetermined conversion rule, and it is sent out as the monitoring signal. The monitoring signal can have an arbitrary waveform determined by the digital data stored in the memory 42 and an arbitrary frequency depending on the output frequency of the oscillator 41. The waveform and frequency of the monitoring signal are determined by digital data stored in the memory 42 and the frequency of the oscillator 41 which is highly stabilized by the use of a crystal oscillation element, whereby an accurate and steady monitoring signal can be produced. It should be noted that the oscillator 41 need not be provided in practice, since the output of a crystal oscillator used invariably for the microprocessor based digital processor 9 in FIG. 3 can be utilized. The memory 42, which may be of a small capacity type, is available at a sufficiently low cost owing to the ever advancing semiconductor technology. The D/A converter 43 may be of a low-speed type with the input of as many as 8 bits. In consequence, the arrangement of FIG. 4 can be configured at an extremely low cost as compared with assemblying the mimic power transmission line 4 shown in FIG. 1.

Next, fundamentals of input signal processing for testing the digital protective relay will be described before entering into the explanation for the operation of the inventive arrangement.

First, the PCT input signal (Is) 21 produced by the voltage and current transformers PT and CT are sampled and subjected to signal conversion so that the information can be processed by the digital processor 9. The input transformer 22 is designed so that the maximum voltage and current of the power transmission system produce the maximum input level for the A/D converter 12. The voltage signal across the output winding of each transformer 22 is fed to the analog filter 24.

The digital protective relay realizes total filter characteristics required by various relay characteristics by combination of digital processing and analog processing. The prime purpose of the analog filter 24 is to cut high frequency components higher than the knee frequency. In the digital relay, frequency components above the knee frequency are attenuated completely to a negligible level in consideration of the frequency band needed for the characteristics of the relay.

After being conducted through the filter 24, the input signals are sampled by a set of sample holding circuits 25. The sampling period is generally selected to an electrical angle of 30° of the power system frequency, i.e., 600 Hz for the 50 Hz system, or 720 Hz for the 60 Hz system, based on the sampling theory, the ability of the digital processor, and the convenience of data processing in the relay computation algorithm. Since voltage and current data sampled at the same time point is needed for the relay computation algorithm, sample holding circuits 25 are provided for all input channels separately as shown in FIG. 3, so that all input signals which vary continuously are sampled simultaneously and held until they are converted into digital data. The input signals from the power transmission system are processed in this way and, then, used by the digital processor 9 for the computation of the protective relay function.

Next, basing on the foregoing arrangement and input signal processing, the operation of the inventive automatic relay monitoring system will be described. The monitoring signal (Iref) is generated by the monitoring signal generating circuit 23, amplified by the amplifier 20, floated from other circuits by the insulating transformer 30, and applied uninterruptedly to one of primary windings of each input transformer 22 which has another primary winding receiving a PCT input signal 21. The monitoring signal (Iref) is set to have a magnitude small enough as compared with the PCT input signal at its maximum level, e.g., the maximum fault current in the case of the CT input. This restriction is needed from the setup of the dynamic range for dealing with a detected signal extending from small to large input level. On the other hand, if the monitoring signal (Iref) is made to small, it becomes difficult too detect the change in the gain of the filter 24.

The monitoring signal (Iref) mixed with each PCT input signal on the input transformer 22 is fed through the filter 24, sample holding circuit 25 and multiplexer 26, and transformed into a digital value by the A/D converter 12.

Digital data produced by the A/D converter 12 represents the analog input sampled in a period proper to the above-mentioned relay algorithm, i.e., generally sampled at every 30° electrical angle of the power system. The processor 9 performs the following processes for the digital data so as to detect a fault in the circuit ranging from the input transformer 22 to the A/D converter 12.

Process A: Extraction of Monitoring Signal (Iref) Component

In order to test the input circuit without being affected by the PCT input 21, only the monitoring signal (Iref) component needs to be extracted from digital data provided by the A/D converter 12. In the following discussion, an assumption is made as an example that the monitoring signal (Iref) has a frequency four times the frequency of the power system.

The frequency response of a digital filter for adding data out of phase with each other by 180° electrical angle of the power system is expressed by Equation (1).

$$G = 2 \left| \cos \frac{n \cdot \pi}{2} \right| \qquad (1)$$

where G is the gain (output/input) of the filter, and n is the ratio of the filter input frequency to the power frequency.

Application of the power frequency (n=1) and monitoring signal frequency (n=4) to Equation (1) gives:
For power frequency (n=1), $G = 2 | \cos \pi/2 | = 0$
For monitoring signal frequency (n=4), $$G = 2 \left| \cos \frac{4\pi}{2} \right| = 2$$

Figure 5:
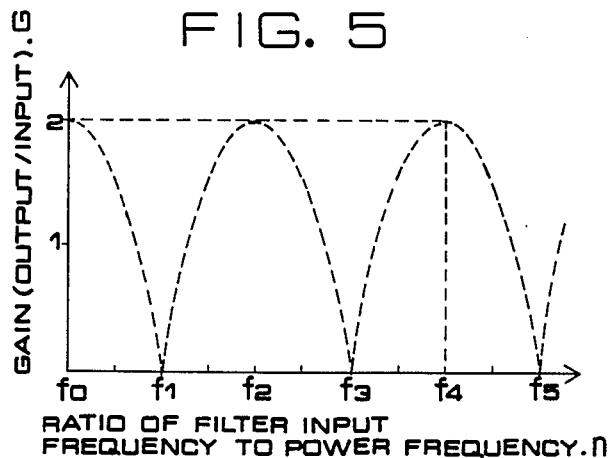
FIG. 5 is a graph showing the relationship between the output gain and the ratio of frequencies in extracting the monitoring signal component.

Accordingly, the power frequency component is eliminated and the monitoring signal component is extracted in doubled level. FIG. 5 depicts the Equation (1) in a graph. As can be seen from the graph the same extracting process is effective when the monitoring signal frequency is set twice the power frequency, and it can be set to other frequency by employment of a modified process scheme.

Process B: Detection of a Fault Based on the Magnitude of Extracted Monitoring Signal In this example, the signal sampling period is set to 30° electrical angle of the power system, and thus the sampling frequency is 12 times the power frequency, allowing the calculation of the magnitude of the monitoring signal from sampled data on the basis of the sampling theory. Two methods are possible for detecting a fault in the circuit ranging from the input transformer 22 to the A/D converter 12 based on the calculated magnitude of the monitoring signal. One is the comparison of the calculation result with a reference value prepared in the processor 9, and the other is the comparison among a plurality of extracted monitoring signals.

On the other hand, the computation for the protective relay function needs data in which the monitoring signal (Iref) is eliminated, i.e., only the PCT input component 21 is the power frequency is extracted. This data used for the relay computation is obtained through the following process. Process C: Extraction of PCT Input Component In order to eliminate the monitoring signal component with a frequency four times the power frequency and extract the PCT input component, sampled data is subjected to the digital filtering process expressed by Equation (2).

$$G = 2 \left| \sin \frac{n \cdot \pi}{4} \right| \qquad (2)$$

where G is the gain (output/input) of the filter, and n is the ratio of the filter input frequency to the power frequency.

Application of the power frequency (n=1) and monitoring signal frequency (n=4) to Equation (2) gives:
For power frequency (n=1), $$G = 2 \left| \sin \frac{\pi}{4} \right| = \sqrt{2}$$

For monitoring signal frequency (n=4), $$G = 2 \left| \sin \frac{4\pi}{4} \right| = 0$$

Figure 6:
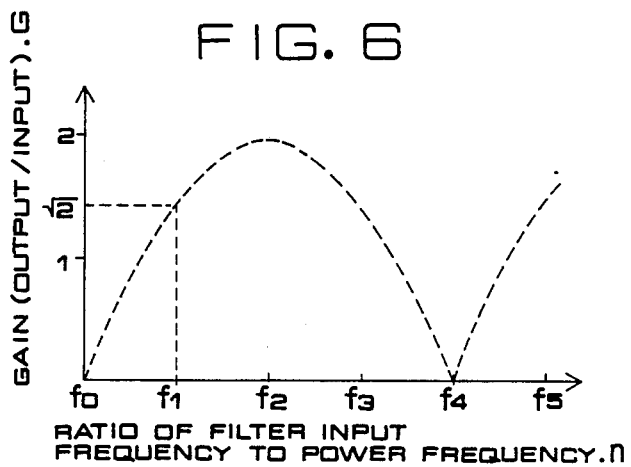
FIG. 6 is a graph showing the relationship between the output gain and the ratio of frequencies in extracting the PCT input component.

Accordingly, the monitoring signal (Iref) component is eliminated, and the PCT input component 21 with the power frequency is extracted with a gain of $\sqrt{2}$. FIG. 6 depicts the Equation (2) in a graph. The monitoring signal with various frequencies can be eliminated using similar principles, and digital filters based on different equations can also be designed.

Through the foregoing processes A, B and C, the fault detection in the analog input circuit ranging from the input transformer 22 to the A/D converter 12 is conducted using the monitoring signal (Iref), while at the same time the computation for the protective relay function can be carried out without being affected by the superimposition of the monitoring signal (Iref).

The monitoring signal frequency is not limited to be four times the power frequency as mentioned previously, but it cannot be equal to the power frequency, because of the need of signal separation based on different frequencies. The monitoring signal frequency cannot be higher than the knee frequency defined in the sampling theory, because otherwise the signal would mostly be absorbed by the filter 24.

Although in the foregoing embodiment the monitoring signal generating circuit is exemplified as the combination of a memory and a D/A converter, any circuit arrangement providing a signal with a predetermined output level and frequency may be used. For example, such a circuit can be obtained as a Wien bridge type oscillator, or achieved by combining a rectangular wave with a low-pass filter. The insulating transformer 30 in FIG. 3 may be removed if there is no problem of surge noise, and the amplifier 20 may be removed if the signal source 23 is less loaded with the input transformers 22.

Figure 1:
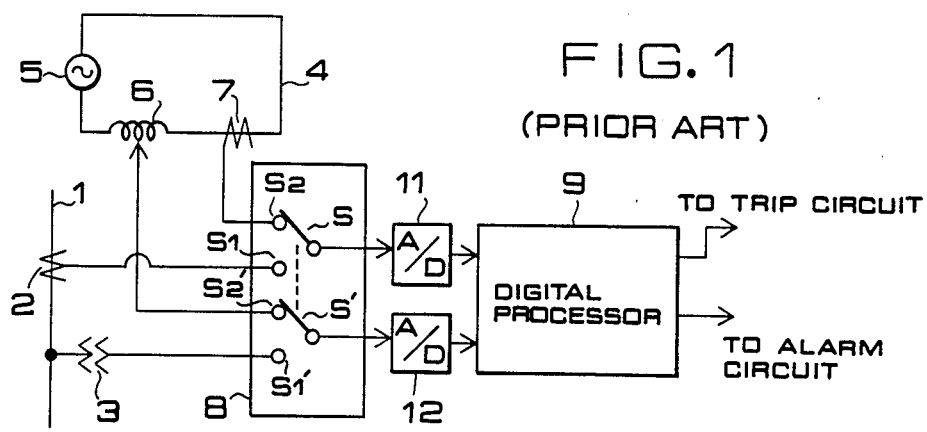
FIGS. 1 and 2 are block diagrams used to explain the conventional digital protective relay monitoring system.
Figure 7:
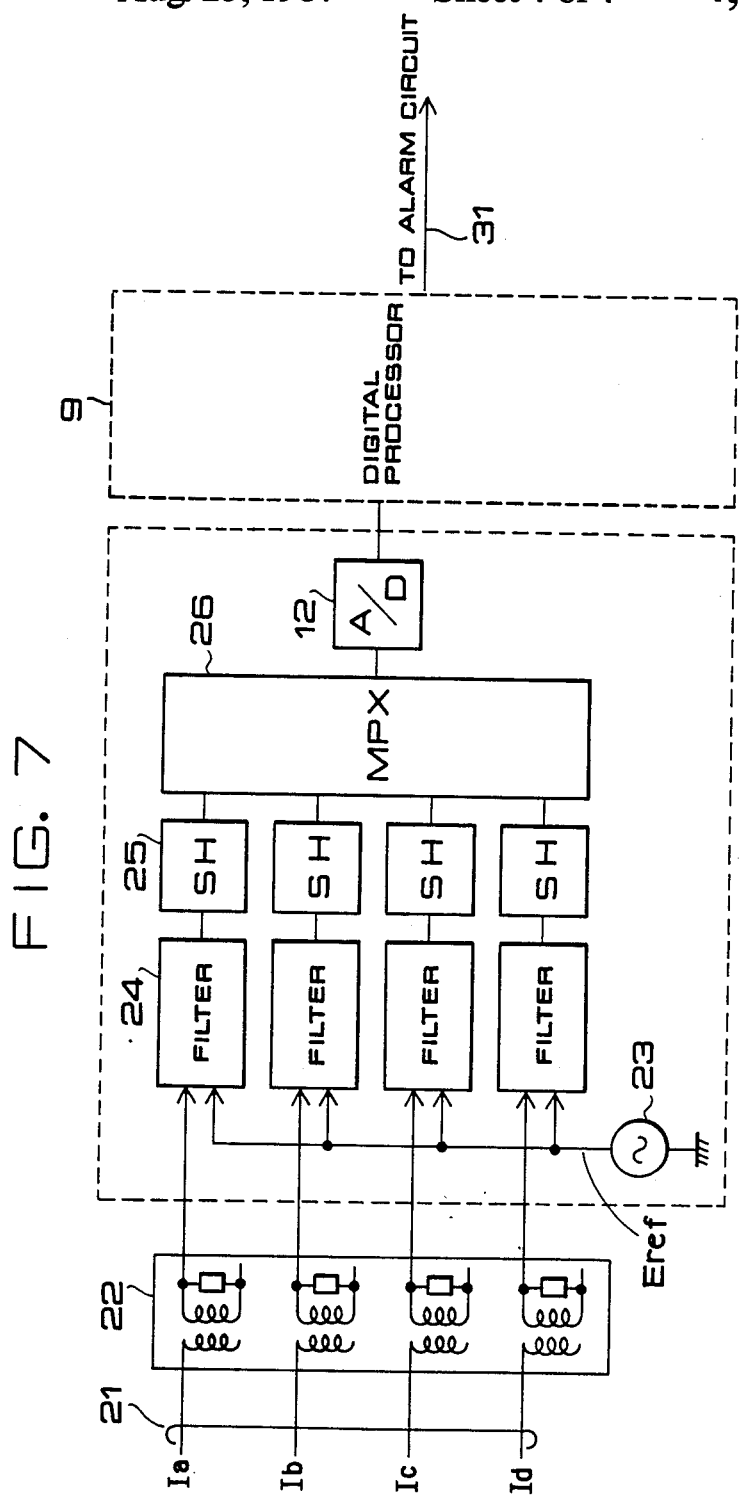
FIG. 7 is a block diagram showing the digital protective relay monitoring system according to another embodiment of this invention.

Next, another embodiment of the present invention will be described with reference to FIG. 7, in which the same or equivalent components to those shown in FIG. 3 are referred by the common symbols. In this arrangement, the PCT signals 21 sent from the PT and CT on the power transmission line, as shown in FIG. 1, are received by a set of input transformers 22, and after being converted from current signals into voltage signals on the output of the transformers 22 the signals are fed to respective filters 24. Different from the case of FIG. 3, the monitoring signal of this embodiment is a voltage signal (Eref), and it is added to each of signals from the input transformers 22 by the ability of addition provided for the filters 24.

Figure 8:
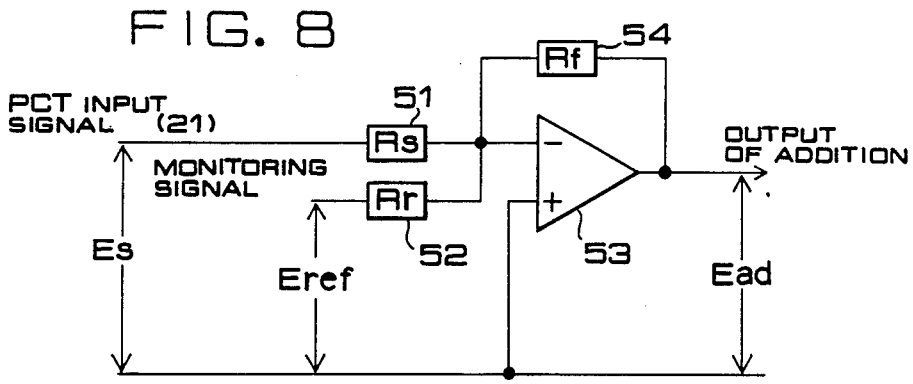
FIG. 8 is a schematic diagram showing in detail one of the filters shown in FIG. 7.

FIG. 8 shows the input section of the filter 24 for adding the PCT input signal 21 and the monitoring signal (Eref). The PCT input signal 21 and monitoring signal (Eref) are fed through input resistors (Rs) 51 and (Rr) 52, respectively, to the inverting input of an operational amplifier 53, which has the output fed back through a feedback resistor (Rf) 54 to the input. This circuit arrangement is generally called the addition circuit of negative feedback type using an operational amplifier, and its output (Ead) is expressed by Equation (3).

$$Ead = Rf \times \left( \frac{Es}{Rs} + \frac{Eref}{Rr} \right) \quad (3)$$

where Es represents the voltage value of the PCT input signal 21.

The same processes as of the previous embodiment shown in FIG. 3 take place for extracting the monitoring signal (Eref) component, detecting a fault based on the magnitude of the sampled monitoring signal, and extracting the PCT input signal component, whereby the fault detection in the analog input circuit ranging from the filters 24 to the A/D converter 12 is conducted without being affected by the superimposition of the monitoring signal. The circuit for adding the monitoring signal to each PCT signal is simply arranged as shown in FIG. 8, and the circuit operates within a signal level of ±10 volts, thereby eliminating the need for amplifying the monitoring signal.

The digital protective relay monitoring system according to the present invention is advantageous over the prior art system in the following respects.

(1) The system is capable of fault detection throughout the input circuit ranging from the input transformers to the A/D converter. (FIG. 3)

(2) The system is capable of monitoring the CT input circuit and the like, in which the input does not always exist, by superimposing the monitoring signal on the input signal.

(3) The system monitors the circuit uninterruptedly by the superimposition of the monitoring signal, while carrying out the protective relay function without suspension as opposed to the conventional system, whereby a fault can be detected promptly.

(4) The system provides an accurate magnitude and frequency for the monitoring signal, whereby accurate fault detection is free from a possible variation of the monitoring signal.

(5) The system is also applicable to the conventional detection input supplying method in addition to the continuous monitoring system in explanation of the effect of item (4).

(6) The system does not need a large scale device such as a mimic power transmission line, and thus it can be constructed inexpensively.

What is claimed is:

1. A digital protective relay monitoring system comprising
input transformers for receiving input signals reflecting a current and voltage of a power line,
analog filters provided correspondingly for said input transformers for eliminating unwanted high frequency components included in the output of said input transformers,
sample holding circuits for sampling and holding the output of said filters,
a multiplexer for sequentially selecting voltage signals held in said sample holding circuits in a predetermined order,
an analog-to-digital converter for converting the output of said multiplexer into a digital signal,
a digital processor for processing the output of said analog-to-digital converter to make a decision of protective action for said power transmission line,
means for supplying a monitoring signal with a predetermined frequency to said input transformers,
said predetermined frequency being less than the high frequency components eliminated by the analog filters and being different from a power frequency of said power line so that said monitoring signal can be extracted from a power signal by digital filtering, and
digital filter means provided in said digital processor for extracting a component of said monitoring signal in the output of said analog-to-digital converter and detecting a fault in said input transformers, or analog filters, or sample holding circuits, or multiplexer, or analog-to-digital converter, based on the magnitude of said extracted signal component.

2. A digital protective relay monitoring system according to claim 1, wherein said means for supplying said monitoring signal comprises an oscillator, a counter for counting the output of said oscillator, a memory for providing prerecorded digital data by being addressed by the output of said counter, and a digital-to-analog converter for converting said digital data into an analog signal in accordance with a predetermined conversion rule.

3. A digital protective relay monitoring system according to claim 1, wherein said predetermined frequency of said monitoring signal is four times the power frequency on said power line.

4. A digital protective relay monitoring system comprising
input transformers for receiving input signals reflecting a current and voltage of said power line,
analog filters provided correspondingly for said input transformers for eliminating unwanted high frequency components included in the output of said input transformers,
sample holding circuits for sampling and holding the output of said filters,
a multiplexer for sequentially selecting voltage signals held in said sample holding circuits in a predetermined order,
an analog-to-digital converter for converting the output of said multiplexer into a digital signal,
a digital processor for processing the output of said analog-to-digital converter to make a decision of protective action for said power transmission line, means for supplying a monitoring signal with a predetermined frequency to said filters, said predetermined frequency being less than the high frequency components eliminated by the analog filters and being different from a power frequency of said power line so that said monitoring signal can be extracted from a power signal by digital filtering, and digital filter means provided in said digital processor for extracting a component of said monitoring signal in the output of said analog-to-digital converter and detecting a fault in said input transformers, or analog filters, or sample holding circuits, or multiplexer, or analog-to-digital converter, based on the magnitude of said extracted signal component.

5. A digital protective relay monitoring system according to claim 4, wherein each of said filters comprises at the front end thereof an addition circuit of a negative feedback type including an operational amplifier, said addition circuit adding said monitoring signal to said input signal.

6. A digital protective relay monitoring system according to claim 4, wherein said predetermined frequency of said monitoring signal is four times the power frequency on said power line.

* * * * *